United States Patent [19]

Kassai

[11] Patent Number: 4,706,214

[45] Date of Patent: Nov. 10, 1987

[54] INTERFACE CIRCUIT FOR PROGRAMMED CONTROLLER

[75] Inventor: Yoshio Kassai, Aichi, Japan

[73] Assignee: Mitsubishi Denki Kabushiki Kaisha, Tokyo, Japan

[21] Appl. No.: 623,154

[22] Filed: Jun. 21, 1984

[30] Foreign Application Priority Data

Jun. 22, 1983 [JP] Japan ................................ 58-112067

[51] Int. Cl.[4] ............................................. G06F 3/00
[52] U.S. Cl. ..................................... 364/900; 364/200
[58] Field of Search ... 364/200 MS File, 900 MS File; 365/219, 220, 221

[56] References Cited

U.S. PATENT DOCUMENTS

| 3,815,099 | 6/1974 | Cohen et al. | 364/200 |
| 4,150,364 | 4/1979 | Baltzer | 315/365 |
| 4,170,038 | 10/1979 | Bouvier et al. | 364/200 |
| 4,218,740 | 8/1980 | Bennett et al. | 364/200 |
| 4,388,683 | 6/1983 | Beifuss et al. | 364/200 |
| 4,417,320 | 11/1983 | Ei | 364/900 |

Primary Examiner—Gareth D. Shaw
Assistant Examiner—Christina Eakman
Attorney, Agent, or Firm—Bernard, Rothwell & Brown

[57] ABSTRACT

An interface circuit for a programmed controller disposed between the CPU of the programmed controller and an input/output unit includes eight $N \times 1$-bit RAMs with simultaneous operating switching circuits for accessing the RAMs in parallel by the input/output unit and with sequential operating selecting circuits for accessing the RAMs serially by the CPU, whereby the interfacing process is sped up.

3 Claims, 1 Drawing Figure

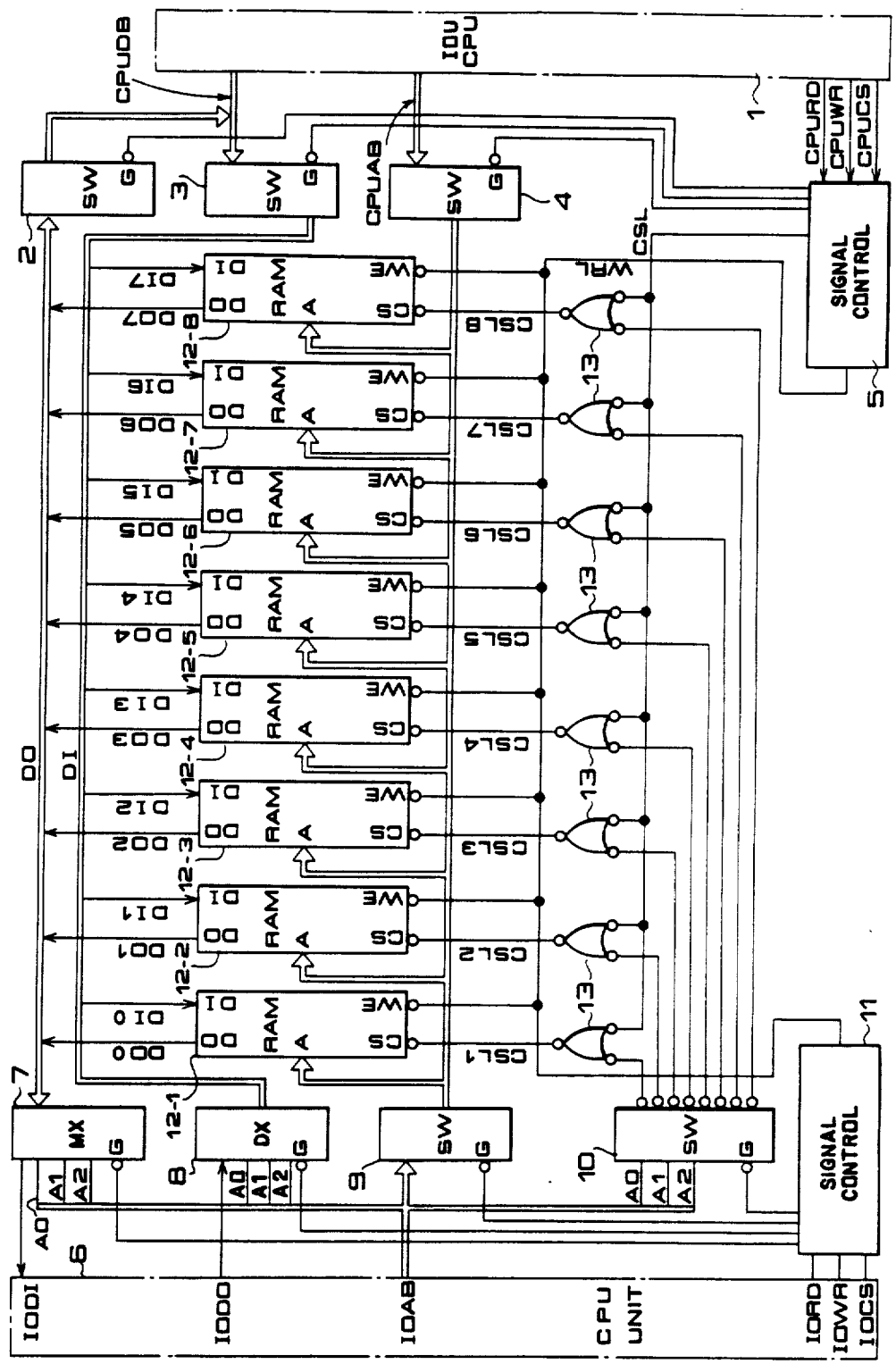

INTERFACE CIRCUIT FOR PROGRAMMED CONTROLLER

BACKGROUND OF THE INVENTION

The present invention relates to an interface circuit interposed between a central processing unit (CPU) of a programmed controller and an input/output unit having a data link unit other than the CPU.

SUMMARY OF THE INVENTION

It is an object of the present invention to provide an interface circuit for a programmed controller capable of speeding up the interfacing process.

According to one form of the present invention, there is provided an interface circuit used for interfacing a CPU of a programmed controller with an input/output unit having a CPU and a data link unit other than the first-mentioned CPU, wherein the circuit comprises a plurality of N×1-bit RAMs (Random Access Memory units), means operated by the controller CPU to individually access the RAMs one at a time, and means operated by the input/output unit to access in parallel all of the RAMs simultaneously.

Other objects and features of the present invention will become more apparent from the following detailed description taken in conjunction with the accompanying drawing.

BRIEF DESCRIPTION OF THE DRAWINGS

The FIGURE shows in block form the interface circuit for a programmed controller embodying the present invention.

DESCRIPTION OF THE PREFERRED EMBODIMENTS

The invention will now be described by way of illustrated embodiment. In the figure, reference number 1 denotes a CPU of an input/output unit, reference number 2 denotes a data bus input switch, reference number 3 denotes a data bus output switch, reference number 4 denotes an address bus switch, and reference number 5 denotes a control signal circuit, constituting in combination a parallel input/output data switching circuit for the input/output unit 1. Reference number 6 denotes a CPU of a programmed controller, reference number 7 denotes an address controlled selective data bus input switch or multiplexer, reference number 8 denotes an address controlled selective data bus output switch or demultiplexer, reference number 9 denotes an address bus switch, reference number 10 denotes a memory selection decoder, and reference number 11 denotes a control signal circuit, constituting in combination a serial or individual input/output data switching circuit for the CPU 6. Reference numbers 12-1 through 12-8 denote N×1-bit RAMs (Random Access Memory units) wherein N is greater than 1, and reference numbers 13 denote OR gates, arranged between the CPU 6 of the programmed controller and the CPU 1 of the input/outputt unit. Thus, the arrangement forms a 2-port RAM circuit which is accessed as individual N×1-bit RAMs by the CPU 6 of the programmed controller and, at the same time, accessed as a parallel 8-bit RAM by the input/output unit.

The operation of the above arrangement will be described. First, when the CPU 1 of the input/output unit makes access to the RAMs 12-1 through 12-8 for writing, the control signal circuit 5 enables the CPU data bus output switch 3 and CPU address bus switch 4, selects the RAMs 12-1 through 12-8 by the chip select signals CSL1–CSL8 through the OR gates 13, and issues a write pulse WRL. Then, the N×1-bit RAMs 12-1 through 12-8 are accessed simultaneously as an 8-bit RAM, and 8-bit data is written in parallel into the RAMs at the address on the CPUAB or address bus of the input/output unit.

When the CPU 1 reads out the RAMs 12-1 through 12-8, the control signal circuit 5 enables the CPU data bus input switch 2 and CPU address bus switch 4, and selects all of the RAMs by the chip select signals CSL1–CSL8 through the OR gates 13. Then, the N×1-bit RAMs 12-1 through 12-8 are accessed simultaneously as an 8-bit RAM, and 8-bit data is read out of them in parallel.

On the other hand, when the CPU 6 of the programmed controller makes access to the 1-bit RAMs 12-1 through 12-8 for writing, the control signal circuit 11 enables the selectine data bus output switch or demultiplexer 8 and address bus switch 9, selects in cooperation with the memory selection decoder 10 the 1-bit word RAMs sequentially by the chip select signals CSL1–CSL8 through the OR gates 13, and issues a write pulse WRL. Then, each of the RAMs 12-1 through 12-8 is accessed sequentially as a N×1-bit RAM, and bit data can be written to each of the RAMs.

When the CPU 6 reads out the RAMs 12-1 through 12-8, the control signal circuit 11 enalbes the selectine data bus input switch or multiplexer 7 and address bus switch 9, and selects in cooperation with the memory selection decoder 10 the N×1-bit RAMs 12-1 through 12-8 sequentially by the chip select signals CSL1–CSL8 through the OR gates 13. Then, each of the RAMs is accessed sequentially, and bit data can be read out of it.

Thus, the foregoing arrangement allows the eight N×1-bit RAMs to be accessed as an 8-bit RAM from the CPU 1 of the input/output unit and also as individual N×1-bit RAMs from the I/O bus of the CPU 6 of the programmed controller, whereby the interfacing process can be sped up.

According to the present invention, as described above, a 2-port RAM circuit is arranged so that the constituent RAMs are accessed as RAMs by the CPU of the programmed controller, while each of the same RAMs is accessed as an 8-bit RAM by the input/output unit, whereby the speed-up of the interfacing process for the programmed controller can be achieved.

What is claimed is:

1. An interface circuit disposed between a central processing unit (CPU) of a programmed controller and an input/output unit (IOU) having a data link unit other than said CPU, said circuit comprising
   a plurality of N×1-bit random access memory units (RAMs) each having address inputs, data input and output means, and a chip-select input, wherein N is greater than 1;
   RAM data bus means having respective lines connected to the data input and output means of the corresponding RAMs;
   a RAM address bus connected to the address inputs of the RAMs;
   IOU accessing means operated by the IOU and including first switch means for connecting the RAM address bus to an IOU address bus, second switch means for connecting the RAM data bus to an IOU data bus, and means for connecting a chip select output of the IOU simultaneously to the chip-select inputs of the RAMs to thereby read and write a plurality of bits in parallel from and to the RAMs; and CPU accessing means operated by the CPU and including third switch means for connecting the RAM address bus to a CPU address bus of the CPU, selective switch means for selectively connecting individual lines of the RAM data bus means from each corresponding RAM to data input and output means of the CPU, and CPU chip select means operated in correspondence with said selective switch means for selectively connecting a chip select output of the CPU to each respective chip select input of the RAMs to thereby read and write a plurality of bits individually from and to the RAMs.

2. An interface circuit according to claim 1, wherein said plurality of N×1-bit RAMs consist of eight N×1-bit RAMs.

3. An interface circuit disposed between a central processing unit (CPU) of a programmed controller and an input/output unit having a data link unit other than said CPU, said circuit comprising:

(a) a plurality of N×1-bit random access memory units (RAMs) wherein N is greater than 1;

(b) a RAM data output bus having lines connected to respective data output terminals of said RAMs;

(c) a data bus input switch connected between said RAM data output bus and a data bus of said input-/output unit;

(d) a multiplexer connected between said RAM data output bus and an input of said CPU;

(e) a data input bus having lines connected to respective data input terminals of said RAMs;

(f) a data bus output switch connected between said RAM data input bus and the data bus of said input-/output unit;

(g) a demultiplexer connected between said data input bus and an output of said CPU;

(h) a RAM address bus connected in common to address input terminals of said RAMs;

(i) a first address bus switch connected between said RAM address bus and address means of said input-/output unit;

(j) a second address bus switch connected between said RAM address bus and address means of said CPU;

(k) a first control signal circuit operated by the input-/output unit and adapted to control said data bus input switch, said data bus switch and said first address bus switch and to provide a chip-select signal and write command signal simultaneously to said RAMs;

(l) a second control signal circuit operated by said CPU and adapted to control said multiplexer, said demultiplexer and said second address bus switch and to provide a write command signal to said RAMs; and (m) a memory selection decoder operated by said second control signal circuit and the address means of said CPU and adapted to provide chip-select signals for sequentially selecting said N×1-bit RAMs.

* * * * *

UNITED STATES PATENT AND TRADEMARK OFFICE
CERTIFICATE OF CORRECTION

PATENT NO. : 4,706,214

DATED : November 10, 1987

INVENTOR(S) : Yoshio Kassai

It is certified that error appears in the above-identified patent and that said Letters Patent is hereby corrected as shown below:

Column 2, line 20, "selectine" should be --selective--;

line 30, "enalbes" should be --enables--;

same line, "selectine" should be --selective--.

Signed and Sealed this

Seventeenth Day of May, 1988

*Attest:*

DONALD J. QUIGG

*Attesting Officer*  *Commissioner of Patents and Trademarks*